(12) United States Patent
Wu

(10) Patent No.: US 11,209,977 B2
(45) Date of Patent: Dec. 28, 2021

(54) QUICK DATA BROWSING METHOD FOR AN ELECTRONIC DEVICE

(71) Applicant: PEGATRON CORPORATION, Taipei (TW)

(72) Inventor: Cheng-Hung Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/843,668

(22) Filed: Apr. 8, 2020

(65) Prior Publication Data

US 2020/0363942 A1 Nov. 19, 2020

(30) Foreign Application Priority Data

May 15, 2019 (TW) .................................. 108116809

(51) Int. Cl.
*G06F 3/0488* (2013.01)
*G06F 3/0485* (2013.01)

(52) U.S. Cl.
CPC ........ *G06F 3/04883* (2013.01); *G06F 3/0485* (2013.01)

(58) Field of Classification Search
CPC .. G06F 3/04883; G06F 3/0485; G06F 3/0482; G06F 3/0488; G06F 3/017
See application file for complete search history.

(56) References Cited

U.S. PATENT DOCUMENTS 9,489,078 B2 11/2016 Seo et al.
10,042,510 B2* 8/2018 Holz .................. G06F 3/04847
2005/0086611 A1 4/2005 Takabe et al.
2007/0146337 A1* 6/2007 Ording .................. G06F 3/0485
345/173
2007/0236475 A1 10/2007 Wherry
2008/0062141 A1 3/2008 Chaudhri et al.
2009/0265658 A1 10/2009 Klishko et al.
2012/0284671 A1 11/2012 Bamford et al.
2012/0327009 A1 12/2012 Fleizach et al.
2014/0215384 A1 7/2014 You et al.
2015/0123916 A1* 5/2015 Inomata .............. G06F 3/04842
345/173

(Continued)

FOREIGN PATENT DOCUMENTS

CN 108803979 A 11/2018
CN 109284457 A 1/2019

(Continued)

*Primary Examiner* — Eric J Yoon

(74) *Attorney, Agent, or Firm* — Li & Cai Intellectual Property (USA) Office

(57) ABSTRACT

The present invention discloses a quick data browsing method for an electronic device. The electronic device stores a plurality of data set. The quick data browsing method includes: displaying initial data of the data set on a screen of the electronic device, the data set being cyclically arranged; receiving a gesture and determining whether the gesture is consistent with a preset gesture; when the gesture is consistent with the preset gesture, obtaining an offset based on an angle of the gesture relative to a central line of the screen; and finding target data based on the offset and displaying the target data. In the quick data browsing method, data can be quickly shifted through a specific gesture, and a user can quickly find required data.

9 Claims, 5 Drawing Sheets

(56) References Cited

U.S. PATENT DOCUMENTS

| | | | |
|---|---|---|---|
| 2016/0092058 A1* | 3/2016 | Min | G06F 3/0485 345/173 |
| 2016/0124591 A1* | 5/2016 | Hisatsugu | G06F 3/0482 715/830 |
| 2016/0188152 A1* | 6/2016 | Chou | G06F 3/0482 345/173 |
| 2016/0349851 A1 | 12/2016 | Eskolin et al. | |
| 2018/0292960 A1 | 10/2018 | Orchard | |

FOREIGN PATENT DOCUMENTS

| | | |
|---|---|---|
| EP | 2000894 A2 | 12/2008 |
| TW | 201222396 A1 | 6/2012 |
| TW | 201245988 A1 | 11/2012 |

* cited by examiner

QUICK DATA BROWSING METHOD FOR AN ELECTRONIC DEVICE

CROSS-REFERENCE TO RELATED APPLICATIONS

This Non-provisional application claims priority under 35 U.S.C. § 119(a) on Patent Application No(s). TW108116809 filed in Taiwan, Republic of China on 2019 May 15, the entire contents of which are hereby incorporated by reference.

BACKGROUND

Technology Field

The present invention relates to a quick data browsing method, and in particular, to a quick data browsing method for an electronic device, so as to reduce time consumption for data searching.

Description of the Related Art

Currently, data, such as contacts in a phone book, call histories, messages, real-time communication or files in a phone is all presented in a ListView manner in an electronic device. As shown in FIG. 1, data 14 related to various applications 12 in an electronic device 10 is also presented as a list. However, as an amount of data continuously increases, the user needs to slide all the way from the first data of a data set to the location of the data of interest if the amount of data is massive (for example, 1000 data, or even tens of thousands of data in a database or Excel fields per page), and the data of interest is located at the middle or farther location on the list. Generally speaking, neither the call history nor the short messaging service has such a quick search function. Therefore, a user needs slide to the location of the data of interest one by one, which is very inconvenient, time-consuming and laborious.

Therefore, regarding the existing data browsing manner of the electronic device, it is necessary to provide a quick browsing method without displaying all the data so a user can quickly find the data of interest.

SUMMARY

A technical solution to solve the problem in the present invention is to provide a quick data browsing method to overcome disadvantages in the prior art that browsing data on an electronic device is time-consuming and laborious.

In order to solve the problem, one of technical solutions used in the present invention is as follows: A quick data browsing method for an electronic device is provided. The electronic device may store a data set. The quick data browsing method includes: displaying initial data of the data set on a screen of the electronic device, the data set being cyclically arranged; receiving a gesture and determining whether the gesture is consistent with a preset gesture; when the gesture is consistent with the preset gesture obtaining an offset based on an angle of the gesture relative to a central line of the screen; and finding target data in the data set based on the offset and displaying the target data.

One of the beneficial effects of the present invention is as follows. In the quick data browsing method of the present invention, the data of data set is cyclically arranged and may be quickly shifted through a specific gesture, so that a user may quickly find the target data without time-consuming and laborious sliding from the beginning to the end of the data set one by one.

For further understanding of the features and technical content of the present invention, the following detailed description of the present invention and drawings are referred to. However, the drawings are only provided for reference and description, and are not intended to limit the present invention.

DETAILED DESCRIPTION

Figure 1:
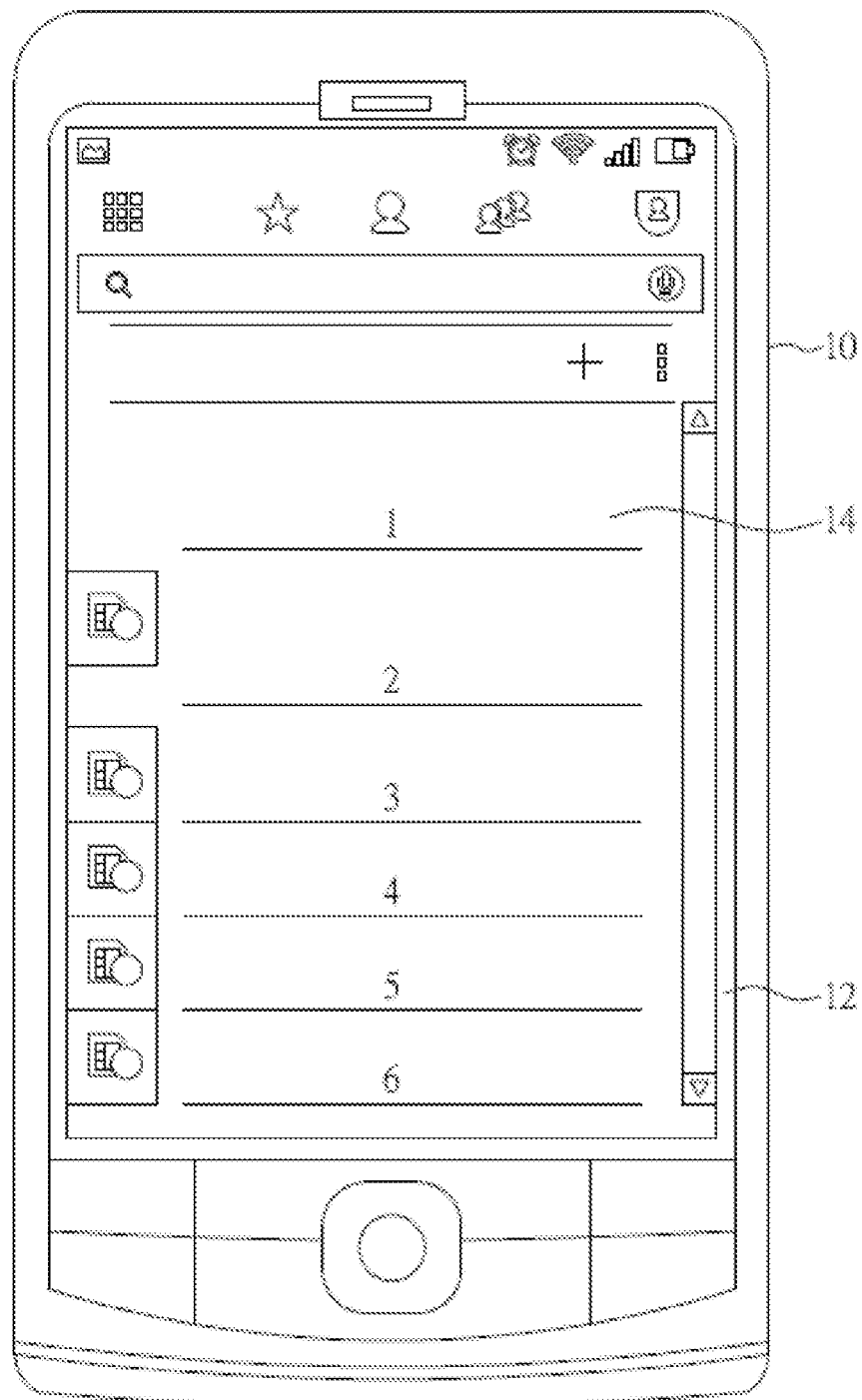
FIG. 1 is a schematic diagram of data in list view for an electronic device.
Figure 2A:
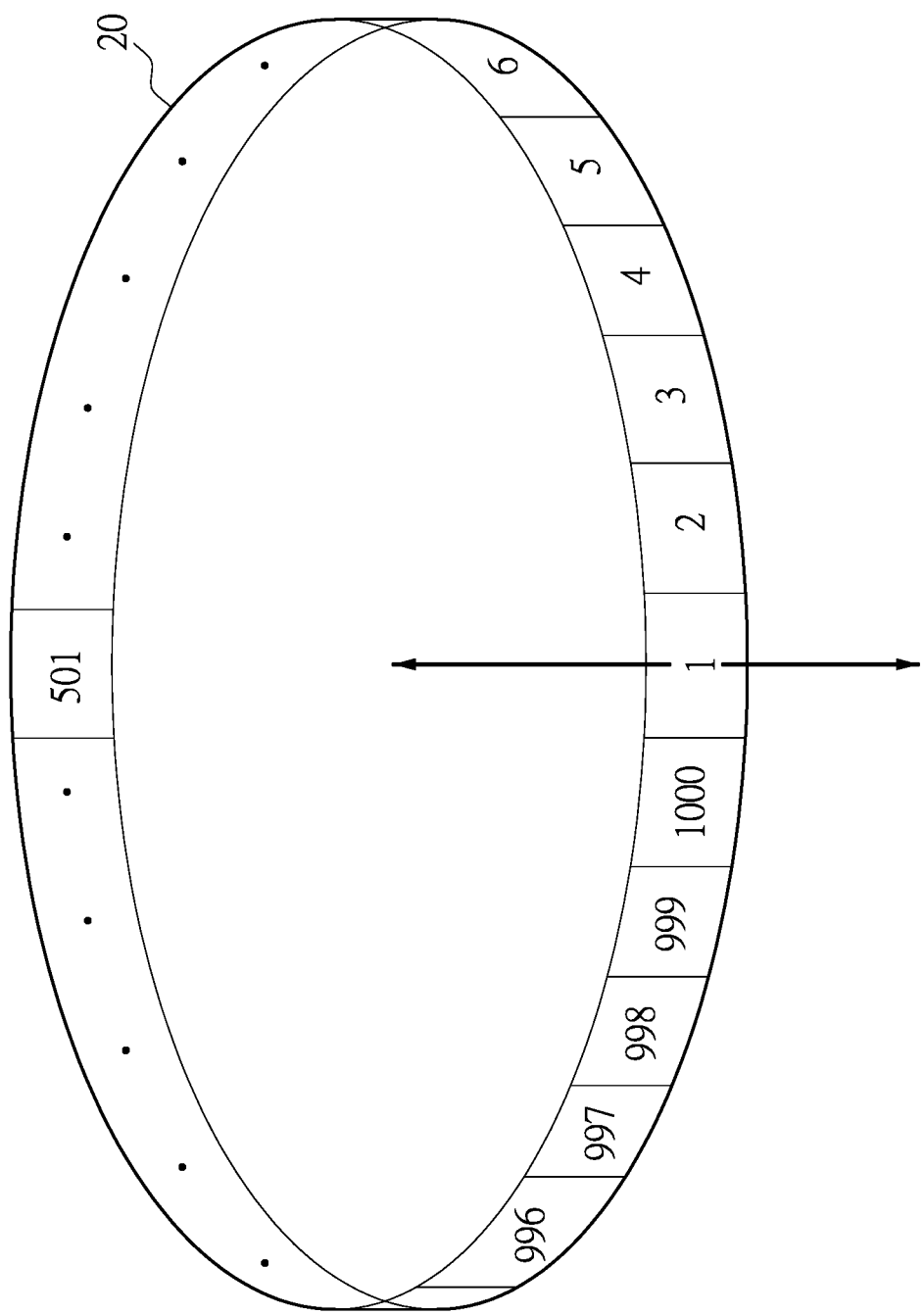
FIG. 2A to FIG. 2C are schematic diagrams of cyclically-arranged data sets according to the present invention.
Figure 2B:
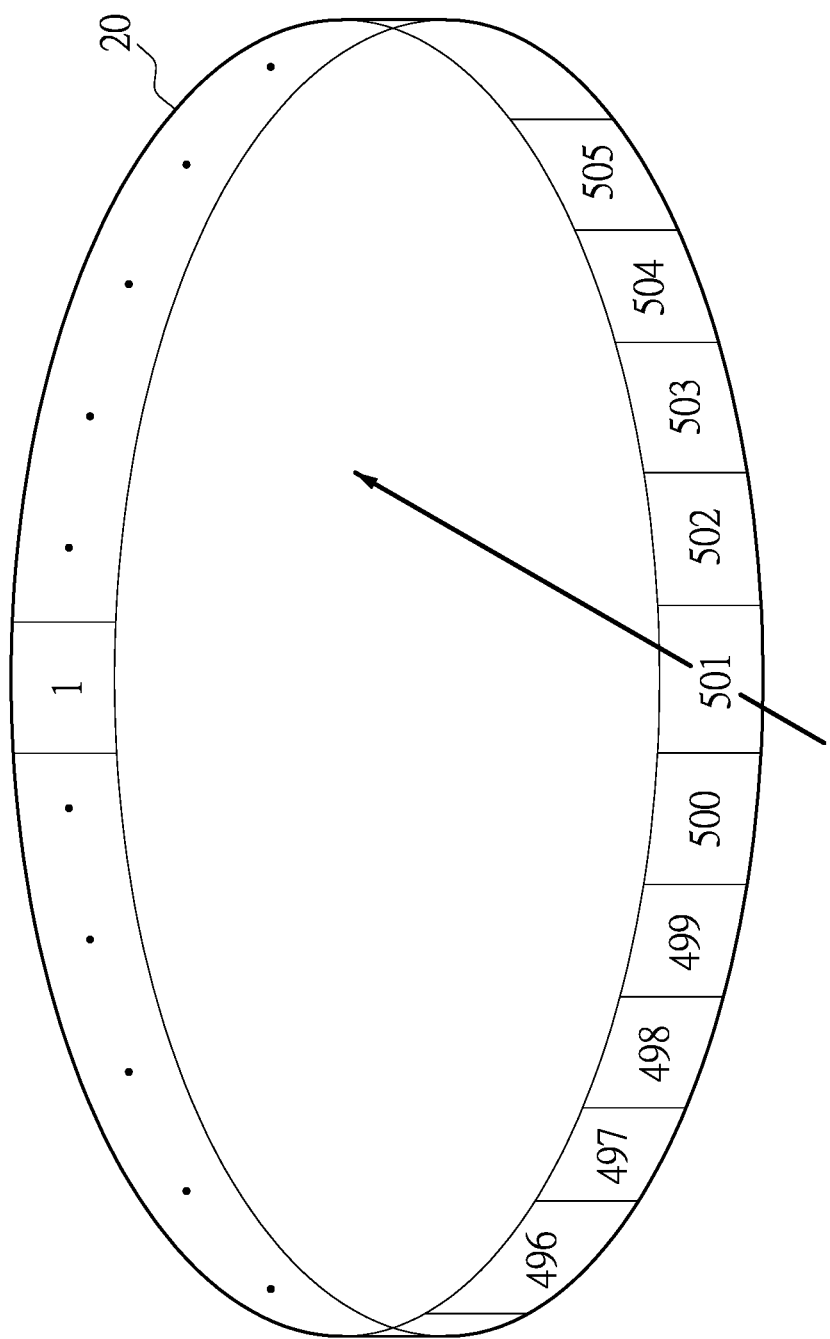
Figure 2C:
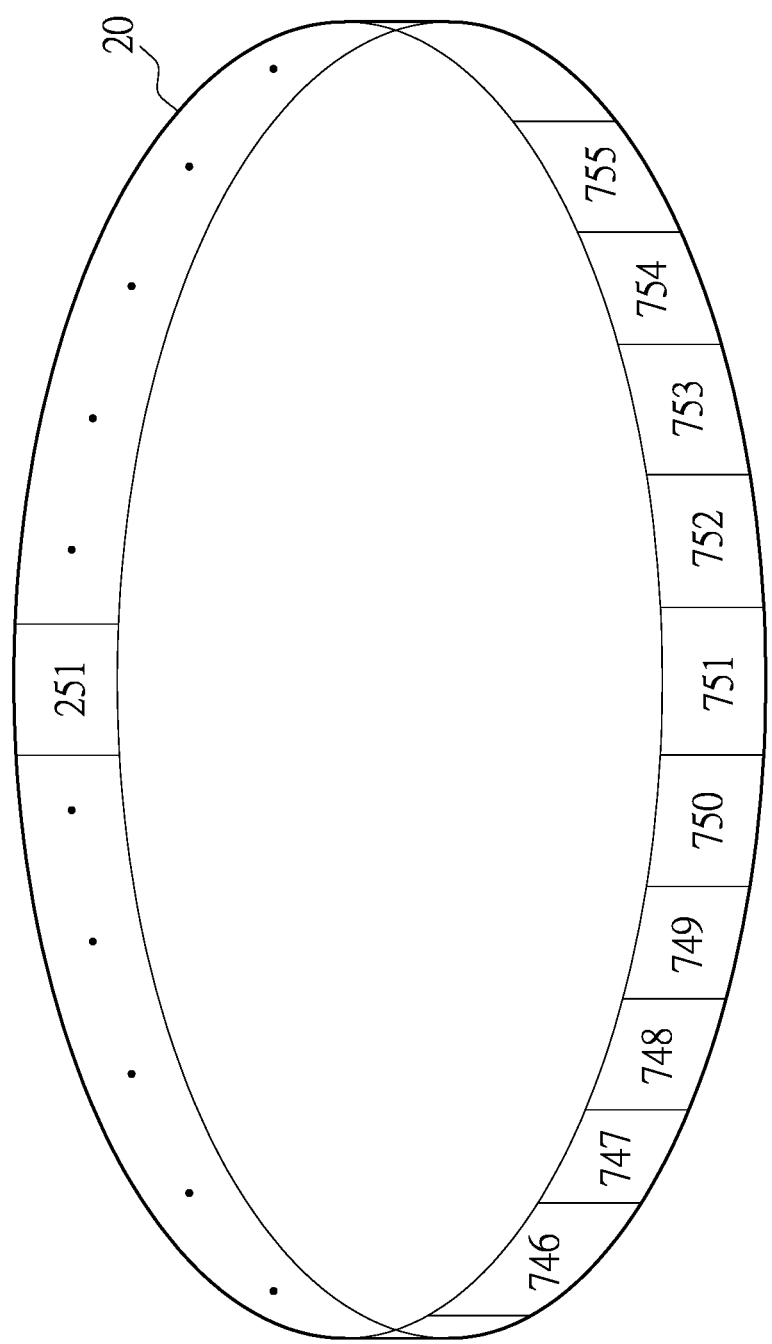

FIG. 2A to FIG. 2C are schematic diagrams of cyclically-arranged data set according to the present invention. As shown in FIG. 2A, cyclically-arranged data set 20 of the present invention includes data arranged cyclically, and a first data of the data set is adjacent to a second data and a last data of the data set. In this embodiment of the present invention, the cyclically-arranged data set is stored in an electronic device, and may be presented to a user in a circle on an application programming interface of the electronic device. In this embodiment of the present invention, it is assumed that there is a thousand data (N=1000) in the data set, and each data has a serial number (index). For example, when a user searches for a $793^{rd}$ data, it takes rather long time to find the target data in a conventional method.

According to the quick data browsing method of the present invention, when two fingers of the user slide vertically upward or vertically downward on the cyclically-arranged data set 20 on the touch screen of the electronic device, the target data may be quickly found through a shift from initial data. In this embodiment of the present invention, it is assumed that the user is currently browsing the initial data (that is, an $n^{th}$ data). When the two fingers of the user slide vertically upward or vertically downward on the cyclically-arranged data set 20, the cyclically-arranged data set 20 of the present invention may quickly shift forward or backward by m offsets from the $n^{th}$ data which is currently browsed. Where, $m=[(N-Index\_n)/2]$; N is a total amount of data; [ ] is a Gaussian symbol; and Index_n is the serial number of the initial data n. It may be learned from the above that a serial number of the target data is Index_n+m. In other words, the offset m is equal to the serial number of the target data minus the serial number Index_n of the initial data. In other words, when the two fingers of the user slide vertically upward or vertically downward on the cyclically-arranged data set 20, the cyclically-arranged data set 20 may quickly shift 500 data from the first data (Index_n=0) according to the present invention. In other words, as shown in FIG. 2B, the finger may do single sliding to shift the cyclically-arranged data set 20 a half data amount forward from the first data.

Because the user intends to find the $793^{rd}$ data, it is still far from the $793^{rd}$ data after the cyclically-arranged data set 20 just shifts to the $501^{st}$ data. Therefore, it may take quite many sliding to reach the $793^{rd}$ data one by one. In this embodiment of the present invention, the user may impose a gesture upper-right by 45 degrees. As shown in FIG. 2B, the cyclically-arranged data set 20 may quickly shift N/4 data from a $(n+m)^{th}$ data according to the present invention. In other words, as shown in FIG. 2C, when the user performs an upper-right gesture by 45 degrees, the cyclically-arranged data set 20 may quickly shift from the $501^{st}$ data to $751^{st}$ data according to the present invention. Since the $751^{st}$ data is very close to the $793^{rd}$ data required by the user, the user may find the $793^{rd}$ data using a general slide-browsing manner. Compared to the existing sliding manner, in this embodiment of the present invention, the data of interest may be found with much less time and much fewer actions.

In addition, it should be noted herein that the foregoing gesture, such as a vertically upward gesture, a vertically downward gesture, a upper-right gesture t by 45 degrees, or a lower-right gesture by 45 degrees is merely used to describe that the cyclically-arranged data set 20 of the present invention may quickly shift according to a specific gesture, but is not intended to impose a limitation on the foregoing gesture. For example, in different embodiments, the preset gesture may be performed by sliding upper-right or lower-right by 30 degrees or 60 degrees, or the preset gesture may be performed by sliding upper-left or lower-left by 30 degrees or 60 degrees to shift the data set forward or backward by an offset of N/12, N/6, or N/3. No limitation is imposed herein. Alternatively, in different embodiments, a bisection method may be used. For example, the user may perform vertically upward or downward sliding again using the same gesture to shift a half amount of the remaining data. In other words, after the first vertically upward or downward sliding, the cyclically-arranged data set 20 shifts to the $501^{st}$ data from the first data, and after the second vertically upward or downward sliding, the cyclically-arranged data set 20 shifts from the $501^{st}$ data to the $751^{st}$ data. Since the $751^{st}$ data is very close to the $793^{rd}$ data, the user may find the $793^{rd}$ data in a general sliding manner, i.e. sliding data one by one with a single finger.

Figure 3:
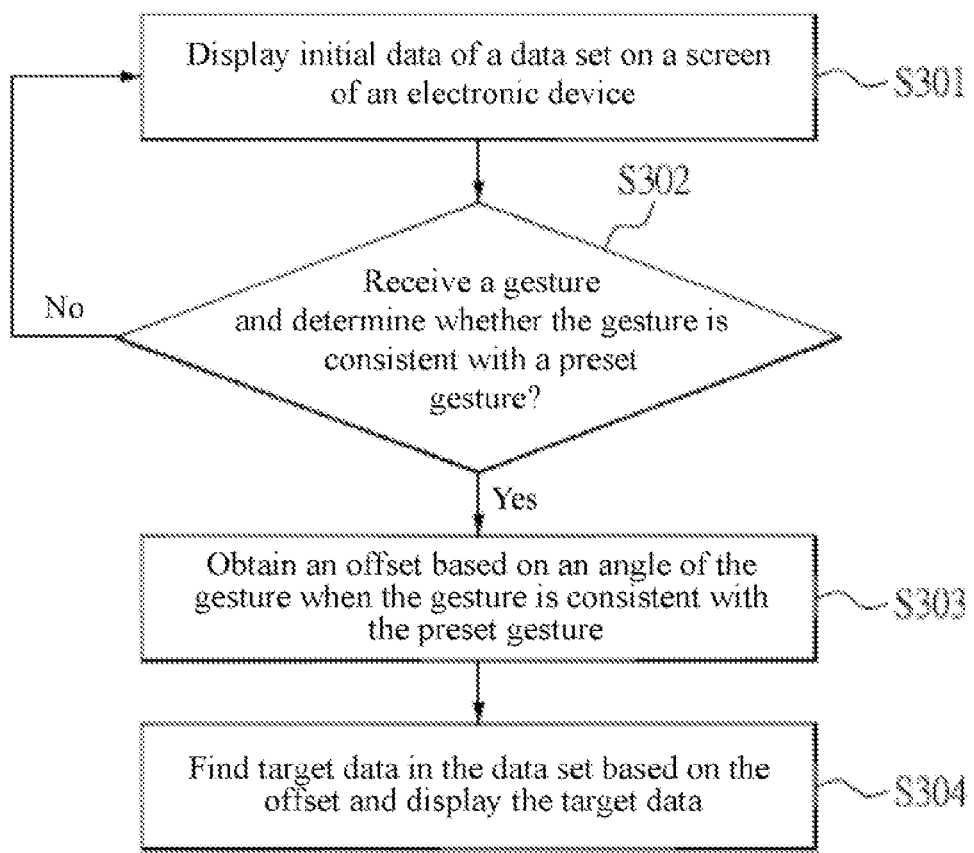
FIG. 3 is a flowchart of a quick data browsing method for an electronic device according to an embodiment of the present invention.

FIG. 3 is a flowchart of a quick data browsing method for an electronic device according to an embodiment of the present invention. As shown in FIG. 3, the present invention discloses a quick data browsing method for an electronic device. The electronic device stores a data set. The quick data browsing method includes the following steps. In step S301, initial data of the data set is displayed on a screen of the electronic device. In other words, when a user enables an application, such as a phone address book, real-time communication, or a short messaging service on the electronic device, the initial data is displayed on the screen of the electronic device. The initial data may be the first data of cyclically-arranged data set, or any data of the cyclically-arranged data set. No limitation is imposed herein. The data of the data set may be displayed cyclically, as shown in FIG. 2A to FIG. 2C, or just some data may be displayed. The present invention is not limited thereto. In step S302, a gesture of a user is received and it is determined whether the gesture is consistent with a preset gesture. The electronic device may detect a touch signal generated on a touch screen when a finger of the user finger or a stylus performs a gesture on the touch screen, and further determine whether the user's gesture is a general touch action or the preset gesture in the quick data browsing method of the present invention. Because the quick data browsing method of the present invention needs to be triggered through a specific gesture, the specific gesture consistent with the preset gesture can activate the quick data browsing method for data browsing. If the gesture is inconsistent with the preset gesture, the gesture is considered merely a general operation on the electronic device, and the user may slowly browse the cyclically-arranged data in a scroll manner, causing inconvenience to the user in use of the electronic device.

The preset gesture may be, for example, sliding upward or downward on the screen of the electronic device with two fingers of the user. Generally, a user performs upward or downward sliding on a screen of an electronic device with one finger. When the user performs upward or downward sliding on the screen, the electronic device with the quick data browsing method of the present invention determines that the user triggers the quick data browsing method. Alternatively, in different embodiments, the preset gesture may be a plurality of multi-point touches performed by the user on the touch screen for triggering the quick data browsing method of the present invention. However, no limitation is imposed herein. In addition, determining a user's gesture through a touch signal by the electronic device is well known to those of ordinary knowledge in the art, and therefore details are not described herein.

However, in a preferred embodiment of the present invention, before step S302, an additional step may be included: the electronic device receives a touch signal generated by a gesture of the user on the data on the touch screen to determine the initial data (the location in the cyclically-arranged data set). The initial data may be the first data or any data in the data set.

In step S303, when the gesture is consistent with the preset gesture, an offset is obtained based on an angle of the gesture relative to a central line of the electronic device, and the serial number of target data may be further obtained based on the offset. For example, when the user's gesture is consistent with the preset gesture, for example, sliding downward by 90 degrees, the offset is a backward shift by a half of the data amount N. In other words, if the cyclically-arranged data set includes 1000 data in total, and the initial data is the first data, the offset is 500 data, and the target data is the $501^{st}$ data. Alternatively, for example, when the user's gesture is consistent with the preset gesture, for example, sliding upper-right by 30 degrees, 45 degrees, 60 degrees, or 90 degrees, the offset is one-sixth, one-fourth, one-third, or a half of the total data amount N of the data set. In other words, if the cyclically-arranged data set includes 1000 data in total, and the initial data is the first data, the target data is a $167^{th}$, $251^{st}$, $334^{th}$, or $501^{st}$ data. In another embodiment of the present invention, when the user's gesture is consistent with the preset gesture, for example, sliding upper-left by 30 degrees, 45 degrees, 60 degrees, or 90 degrees, the offset is a forward shift by one-sixth, one-fourth, one-third, or a half of the total data amount N of the data set. In other words, if the cyclically-arranged data set includes 1000 data in total, and the initial data is the $501^{st}$ data, the data set shifts forward to a $335^{th}$, $251^{st}$, $168^{th}$, or back to the first data from the $501^{st}$ data.

In addition, it should be noted that the examples above are merely used for the quick data browsing method of the present invention by which the target data is quickly found through a specific gesture consistent with the preset gesture, but the quick data browsing method of the present invention is not limited to the foregoing preset gestures and offsets. For example, in different embodiments, the user may also perform downward sliding by 90 degrees twice with two fingers. During the first sliding, an offset is a backward shift by a half of the total data amount N. During the second downward sliding, an offset goes further backward by a half of the haft amount N/2 to find the $(¾N)^{th}$ data. Similarly, if the second sliding is upward sliding, the offset is a forward shift by a half of the half amount N/2 to find the $(¼N)^{th}$ data.

In this way, the user may also quickly shift the cyclically-arranged data set to quickly find the target data. In addition, an offset for each gesture may be set according to a user's preference, and is not limited thereto.

In addition, it should be noted herein that sliding upward or downward by 90 degrees does not mean sliding upward or downward by accurate 90 degrees. The preset gesture in the quick data browsing method of the present invention includes an angle tolerance. For example, the user performs upward or downward sliding on the screen of the electronic device with two fingers. If an angle of the gesture is within the angle tolerance of the preset gesture, it is determined that the gesture is consistent with the preset gesture. The angle tolerance may be set to be greater than zero degrees and less than 15 degrees. Therefore, a gesture may be considered to be consistent with the preset gesture as long as the gesture is within the angle tolerance so the quick data browsing method of the present invention is triggered to quickly find the target data. For example, the user's gesture slides downward, and an angle of the preset gesture is 90 degrees. As long as an angle of the gesture is between 105 degrees and 75 degrees (the angle tolerance is ±15 degrees), the gesture is considered to be consistent with the preset gesture.

In step S304, the target data is found based on the offset and displayed. After an offset corresponding to the angle of the user's gesture is obtained, in the quick data browsing method of the present invention, the target data is found based on the offset, and the target data is displayed on the screen of the electronic device. Next, the user determines whether the target data is the data of interest, or whether the target data is very close to the data of interest. If so, the quick data browsing method of the present invention ends; or if not, the process returns to step S302 to receive another gesture. The user performs a gesture on the screen of the electronic device again. In the quick data browsing method of the present invention, a new gesture is received, and an offset is obtained based on an angle of the new gesture, and the quick data browsing method of the present invention does not end until the user finds the data of interest or data very close to the data of interest.

In the quick data browsing method of the present invention, the data set may be quickly shifted through a specific gesture, helping a user quickly find corresponding data without a time-consuming and laborious sliding from the beginning to the end.

The above disclosure is only the preferred feasible embodiments of the present invention, and does not constitute a limitation on the patent scope of the present invention. Therefore, any equivalent technical changes made by using the content of the specification and the drawings of the present invention shall fall within the patent scope of the present invention.

What is claimed is:

1. A quick data browsing method for an electronic device, the electronic device storing a data set, and the quick data browsing method comprising:

displaying initial data of the data set on a screen of the electronic device, all data of the data set being cyclically arranged;

receiving a gesture and determining whether the gesture is consistent with a preset gesture;

when the gesture is consistent with the preset gesture, obtaining an offset based on an angle of the gesture relative to a central line of the screen; and finding target data in the data set based on the offset and displaying the target data;

wherein the offset is an amount of data shifting, and the offset is determined by the electronic device using a formula $[(N-\text{Index\_n})/2]$ when the angle of the preset gesture is 0 degrees relative to the central line of the screen; and wherein N is a total amount of the data set, Index_n is a serial number of the initial data, and [ ] is a Gaussian symbol.

2. The quick data browsing method for the electronic device according to claim 1, further comprising: determining whether to receive a touch signal, wherein the touch signal is generated when the gesture is performed on the screen where the data set is capable of being displayed.

3. The quick data browsing method for the electronic device according to claim 1, wherein the preset gesture comprises upward or downward movement of at least one finger on the screen of the electronic device.

4. The quick data browsing method for the electronic device according to claim 3, wherein the preset gesture comprises upward or downward sliding by 30 degrees, 45 degrees, 60 degrees, or 90 degrees.

5. The quick data browsing method for the electronic device according to claim 4, wherein when the preset gesture is upward or downward sliding by 30 degrees, 45 degrees, or 60 degrees, the offset is one-sixth, one-fourth, or one-third of the total amount of the data of the data set.

6. The quick data browsing method for the electronic device according to claim 4, wherein when the angle of the gesture is within an angle tolerance of the preset gesture, it is determined that the gesture is consistent with the preset gesture.

7. The quick data browsing method for the electronic device according to claim 6, wherein the angle tolerance is greater than zero degrees and less than 15 degrees.

8. The quick data browsing method for the electronic device according to claim 1, wherein the preset gesture comprises a plurality of multi-point touches of at least one finger on the screen of the electronic device.

9. The quick data browsing method for an electronic device according to claim 1, further comprising: cyclically presenting the data set on an application programming interface of the electronic device, wherein a first data of the data set is adjacent to second piece of data and last piece of data of the data set.

* * * * *